3,078,164
METHOD OF DRYING DILUTE BIOLOGICAL SOLUTIONS TO PREPARE A FOOD SUPPLEMENT
Auguste Louis de Lisle, Phoenix, Ariz., assignor to Phoenix Gems, Inc., a corporation of Arizona
Filed Mar. 30, 1960, Ser. No. 18,664
3 Claims. (Cl. 99—2)

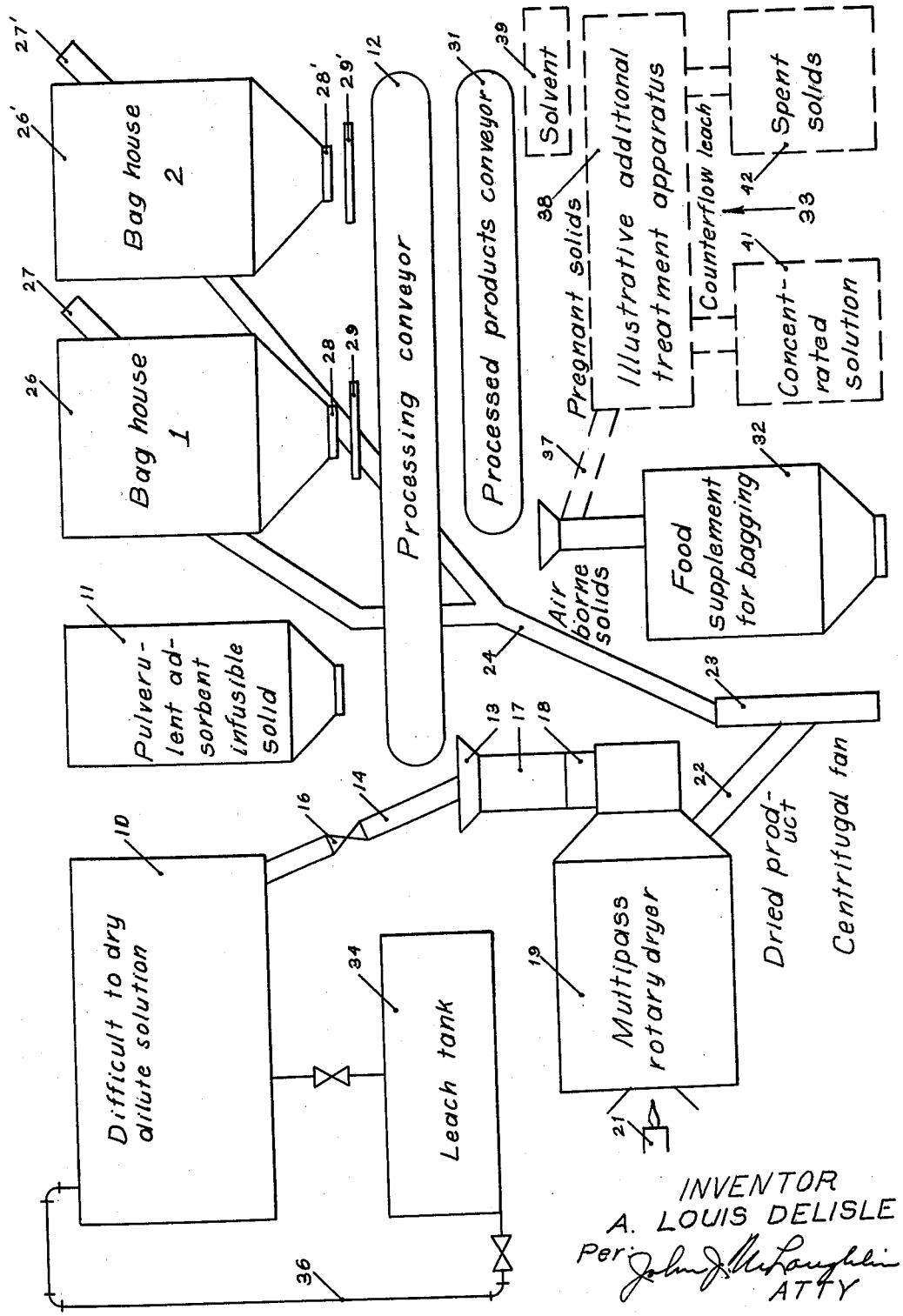

My invention relates in general to the treatment of dilute solutions for the recovery or processing of solute material therein; and more in particular the treatment of dilute solutions to recover solutes therefrom as part of a food supplement product.

There are many industries, of which the milk industry is particularly illustrative, in which products are produced comprising relatively highly dilute solutions which are economically difficult or impossible to handle and which are, therefore, lost to industry and/or agriculture. At other times dilute solutions of materials are handled on a highly marginal basis because of the unavailability of suitable chemical engineering processes for their adequate treatment. The limitations of existing technology and the advantages to be gained by improved processing may be particularly noted by reference to the milk industry.

Major marketable products of the food industry are fresh milk, butter, cheese, fresh cottage cheese and the like. Since there is frequently a limited sale for fresh milk in any given locality, surplus milk is usually processed to recover at least its butter fat. As a result of the handling of milk, there is almost always an excess of skim milk, whey, butter milk from churns, and the like liquids, all of which carry from about 5% to 8% of highly nutrient solid substances (not far) which have not been put to use properly because of limitations in drying and handling techniques.

The present invention is based upon the discovery that diatomaceous earth has important food supplement value, and that diatomaceous earth as well as many other adsorptive, ingestable infusible (in the environment of treatment) solids can be employed to recover biological substances from highly dilute solutions in an improved drying technique which is not only applicable to the production of a food supplement from milk liquids, but has greatly enhanced utility in the chemical process industries.

The principal object of my invention is the provision of an improved food supplement for animal feeding.

Another object is the provision of an improved process for producing such food supplement.

Still another object is the provision of an improved process for the recovery of biological solids such as those derived from milk.

A further object of my invention is the provision of an improved drying process having marked advantages from both a cost and material treatment standpoint.

A still further object of my invention is the utilization of an adsorbent infusible solid for the recovery of solute materials from highly dilute solutions for subsequent chemical and/or physical treatment in the production of a solid state end product therefrom.

One specific embodiment of the invention is illustrated in the accompanying drawings comprising a typical flow sheet for the economic production of a food supplement comprising diatomaceous earth and milk solids adherent to substantially all of the adsorptive surfaces of such diatomaceous earth.

In accordance with the general features of my invention, I utilize a pulverulent adsorptive infusible solid and apply a dilute solution to such solid in such proportion as to produce a semi-dry solid mixture. Illustratively, the proportions may be equal parts by weight of the pulverulent solid and of the dilute solution, but the proportion may vary within the scope of the invention to take up as much dilute solution as possible while still retaining a semi-dry solid. The resulting semi-dry solid is then dried by direct contact with hot gases of combustion, using either the fluid bed technique or gas suspension method depending upon the sensitivity of the material being dried. The material dried by this step will then have a relatively small portion of solid material from the dilute solution adherent to the adsorptive surfaces of the solid material. By again recirculating the dried material and repeated wettings with the dilute solution, the percentage of solids can be built up on the adsoprtive surfaces of the solid material to 50% or more of the mixture. The amount of solute material mixed with the solid material by this method depends on many factors, so there is no firm definition of the parameters except the objectives and economies involved in a particular case.

In the further illustration of the process, reference will be made to the drying of milk solutions such as whey from the production of cottage cheese. Such whey contains about 5% of total solids of which about 3% comprises lactose, the balance of about 2% being made up of albumin, fibrin, globulin, riboflavin and minor proportions of other substances such as salts. Skim milk contains about the same solids as whey, and in addition about 3% of casein. While diatomaceous earth is a particularly advantageous material for the drying of such milk substances, many other organic and inorganic adsorptive infusible solids may be used such as attapulgite and other clays, silica aero-gel, fuller's earth, some bentonites, some talcs, saw-dust, synthetic calcium and other silicates, sponge, alpha-cellulose, and the like.

Referring now to the flow diagram shown in the drawing, assumption will be made that the product to be dried is whey produced as a by-product in the production of cottage cheese and having about 5% of solids and that the solid adsorbent material to be used is powdered diatomaceous earth. The whey is retained in a suitable supply tank 10 and the powdered diatomaceous earth in a suitable bin 11 at the start of the process. A conveyor 12 receives the powdered diatomaceous earth from the bin 11 and delivers it to a mixing hopper 13. A pipe 14 leading from tank 10 has a suitable valve 16 which is controlled to deliver a proper quantity of whey into the hopper 13 for mixture with the diatomaceous earth. Feeding one ton of whey to one ton of diatomaceous earth results in the production of a suitable semi-dry solid for further processing. This semi-dry solid is delivered to a broken flight screw conveyor 17 whence it may be delivered in mixed condition to pelletizer 18 before passing into a multi-pass rotary drum drier 19. Illustrative of a suitable drier for this is the multi-pass rotary drum drier known in the trade as the Heil Brewery Grain Drier. The drum drier 19 is direct fired at 21 so that the hot products of combustion come into direct contact with the semi-dry solid in suspension. The dried product is delivered through a discharge funnel 22 to a centrifugal fan 23 and from such fan to ducts 24 for delivery to either a bag house 26 or a bag house 26' where the dried particles are separated from the gases within which they are entrained. The exhaust gases are discharged from the bag houses through regularly provided vents 27 common to this type of apparatus, and the dried powder is delivered through a chute 28 or 28' to a cross-conveyor 29 or 29'.

When the system has been suitably filled, product feed from the bin 11 is stopped and the product in one of the bag houses which has had one pass through the system is then delivered to the conveyor and this partly laden solid pulverulent adsorptive material is then redelivered to the hopper 13 where it is mixed with fresh whey from tank 10 for reprocessing through the system. This cycle is repeated a number of times depending upon the control of the processing equipment and the final product desired. While the process may be continued until the food supplement product produced by the process contains between about 20% and about 50% milk solids, I have found in general that drying efficiency begins to decrease after the milk solid content reaches a point where it comprises about one-third of the mixture. I have also found that a product containing two parts by weight of diatomaceous earth and one part by weight of milk solids derived from whey is a particularly valuable food supplement. Normally, a product comprising one-third milk solids derived from whey and two-thirds diatomaceous earth is produced by about ten passes through the system. Because the adsorptive surfaces of the diatomaceous earth gradually become burdened with solids, I have found it advisable to reduce the amount of whey fed at each pass proportionately so that in the final pass the solid adsorptive material comprises one ton and the whey only three-quarters of a ton of the total product delivered to the hopper 13. This technique assures the delivery of a semi-dry solid at each pass through the drier.

When the product has been processed to its final specification, the controls are operated to retain it in the bag house through which it has been moving. A fresh batch of diatomaceous earth from bin 11 is then fed to the conveyor and the product discharged from the drier delivered to a second bag house for establishment of a second continuous process employing all of the previously used equipment for the substitution of one bag house for another. In the meantime, the product going into the first bag house is removed for bagging or for additional treatment as desired. The product may be delivered from the bag house by means of the cross-conveyors to a processing conveyor 31 whence it is delivered either to a storage bin 32 or to additional treatment apparatus 33. Further reference will be made to such additional treatment.

From a processing standpoint, several distinct advantages result from the treatment described hereinabove. By comparison with previous processes for drying dilute solutions, I have found that the total cost involved in my process is only a fraction of the total cost of drying biological solutions by available processes of the prior art. I am able, therefore, to take a waste product from milk and convert it economically into a food supplement having highly nutritional properties. While the food product of my invention is new and no direct comparison with products of the prior art is possible, actual cost figures for similar products and processes are illustrative.

Dry whey products are produced currently for about fourteen and one quarter cents per pound. This cost includes no cost figure for the purchase of whey—only a labor cost for its handling. The cost figure does include fuel, labor for operation of the drying equipment and amortization of the relatively expensive drying and processing equipment required. Figures are based upon production of 100,000 pounds of dried whey powder.

To produce 100,000 pounds of dry whey, applicant uses illustratively 200,000 pounds of diatomaceous earth, thereby producing three hundred pounds of food supplement. Total processing costs are $6,850.00, including cost of the diatomaceous earth and amortization of relatively the inexpensive equipment required. This is a price of about two and one-third cents a pound for the food supplement containing the diatomite or about six and three quarter cents per pound for the whey solids portion. Since the specific formulation containing the diatomite has advantageous properties not explainable merely by the whey solids content—as will be explained—it will command a price not directly related to the whey powder market; while the whey powder of the prior art frequently brings a price below its actual cost of production.

By the drying process of my invention, I can also treat sensitive biological and botanical substances for the drying thereof, or for their recovery for further chemical engineering treatment. Included within the biological solutions which can be satisfactorily dried is blood from slaughter houses which is now commonly diverted to fertilizer or disposed of as waste but which has valuable food properties for animal sustenance. Products which can be dried are sape and juices of various plants, trees, vegetables and fruits, such as maple sap, liquid from the pressing of sugar cane, biological insecticide materials such as rotenone, juice from pressed fresh alfalfa, and the like. By macerating pulpy materials such as rotenone and leaching them with water, a much greater proportion of the insecticidal material can be removed and the resulting dilute water solution can be processed to recover the desired substances. Substances which are not desired can be picked up out of solution and the desired product leached by counter-current leaching from the solid material on which it has been adsorbed to produce a concentrated solution for handling in accordance with known processes.

Referring now again to the drawings and assuming that soluble values are to be recovered from a pulped matter such as rotenone root, the pulp is placed in a leach tank 34 and leached with water from tank 10, the pregnant solution from the leach tank being returned through pipe 36 to the tank 10. The dilute solution so produced is then processed in the manner described hereinabove for the drying of whey until the solid adsorbent infusible material has taken up the desired burden of rotenone extract. Albuminous and other extract materials not desired will sometimes also be picked up by the process described (depending on controls utilized) so that the pregnant solution will contain a soluble extract and a relatively insoluble extract. This kind of situation is true for many types of products. For example, in the case of whey, the lactose is soluble and can be leached from the mixture of diatomaceous earth and whey solids leaving behind the albumin, fibrin and globulin.

Illustrative of the further treatment of the pregnant solution, it is delivered from the bag house 26 or 26' through a pipe or chute 37 to one end of a counter-flow leach tank 38. Solvent from a tank 39 is fed in one end of the leach tank 38 and the pregnant solution in the other end. The resulting concentrated solution is recovered in tank 41 and the spent solids in a tank or bin 42. The solvent used may be the same solvent employed in the previous processing or it may be a solvent to differentially leach desired constituents as is common in the chemical arts. The concentrated solution may be treated in accordance with standard known processes and the spent solids may be returned to the system for further processing. In the case of a product like whey, for example, if it were desired to remove the lactose, the partially spent solids could be returned to pick up a further burden of food products to produce a food supplement of a somewhat modified composition as contrasted with a food supplement from which none of the nutrient materials had been leached. By this procedure the more expensive lactose can be recovered without substantial loss in the nutrient value of the end food supplement product.

I referred briefly hereinabove to the discovery that diatomaceous earth seemed to have nutritional value per se and that it was, therefore, preferred as the solid adsorptive material on which to adsorb the food values from dilute biological solutions. While the product produced by the described process comprising for example two parts of diatomaceous earth with one part by weight of milk solids adherent to the adsorptive surfaces thereof may be used as such as a food supplement, it may be mixed with other materials for the production of an animal food. Feeding tests using the food supplement of the present invention show advantages to the test animals, as contrasted to the control animals, apparently not explainable by prior art data available.

Feeding tests employed controls in which the animals received no diatomaceous earth and groups of animals which were given various amounts of diatomaceous earth using the food supplement of the present invention, the maximum amount of diatomaceous earth utilized in any group of animals being 5% of diatomaceous earth calculated on a dry basis. As contrasted with the animals who received no diatomaceous earth, those having 5% of diatomaceous earth grew 30% faster and had a 100% increased adsorption of protein. It is well known that if a beef animal, for example, is fed a diet containing 14% protein, the feces will also gain 14% protein. The animal's utilization of protein is explained by the fact that there is more intake of food elements than excretion, the difference representing the food values utilized. In the case of animals in which the diet included 5% diatomaceous earth, the food ingested contained 14% of protein, but the feces contained only 9% of protein. This differential accounts for the 100% increased protein adsorption in the particular test animals identified. Another noticeable advantage to be indicated is that in a pneumonia epidemic, the mortality of the test animals receiving a diet having 5% of diatomaceous earth was reduced 75% as contrasted with the controls.

While the actual tests discussed relate to a product in which the solids from whey are adherent to the adsorptive surfaces of the diatomaceous earth, other biological liquids such as skim milk, blood, and the like, can also be used to produce exceptionally good food supplements. While there may be other explanations for the unusual nutrient properties of the food supplement of the present invention, one explanation appears to be possibly the fine particle size of the nutrients and their separation on the surfaces of the diatomaceous earth where they are readily available for contact with all of the constituents involved in the digestive process. Whatever may be the explanation, the combination of diatomaceous earth and biological solids produced in accordance with the present invention is a product with new and unexposed properties not heretofore available to the industry.

While I have described my invention in detail so that those skilled in the art may understand the manner of practicing the same, the scope of the invention is defined by the claims.

I claim:
1. The method of drying dilute biological solutions to prepare a food supplement which comprises mixing together a pulverulent infusible adsorbent solid and a substantial proportion of the dilute biological solution to produce a mixture in the form of a semi-dry pulverulent solid, drying said semi-dry pulverulent solid, and continuing to recirculate the resulting dry pulverulent solid, mixing said dry solid with an additional amount of said dilute solution and drying the resulting semi-dry pulverulent solid until the resulting dried pulverulent solid has between about 20% and about 50% of biological solids adherent to adsorptive surfaces of the infusible adsorptive solid.

2. The method of drying dilute biological solutions to prepare a food supplement which comprises mixing together a pulverulent infusible adsorbent solid and a substantial proportion of the dilute biological solution to produce a mixture in the form of a semi-dry pulverulent solid, drying said semi-dry pulverulent solid, and continuing to recirculate the resulting dry pulverulent solid, mixing said dry solid with an additional amount of said dilute solution and drying the resulting semi-dry pulverulent solid until the resulting dried pulverulent solid has between about 20% and about 50% of biological solids adherent to adsorptive surfaces of the infusible adsorptive solid and leaching the resulting pulverulent solid to produce a concentrated solution of a soluble constituent thereof.

3. The method of producing a food supplement which comprises mixing together finely divided diatomaceous earth and about an equal proportion by weight of a liquid milk product, not including cream, drying said mixture of diatomaceous earth and milk solid to produce a dried pulverulent mixture, recirculating the resulting dried pulverulent mixture for further wetting with the said liquid milk product and further drying, and continuing such recirculating and drying until between about 20% and about 50% of milk solids are adherent to adsorptive surfaces of the diatomaceous earth.

References Cited in the file of this patent

UNITED STATES PATENTS

| | | |
|---|---|---|
| 2,173,922 | Supplee | Sept. 26, 1939 |
| 2,254,241 | Pittman | Sept. 2, 1941 |
| 2,739,063 | Wehrmeister | Mar. 20, 1956 |
| 2,879,161 | Valentine | Mar. 24, 1959 |